J. C. PELTON.
APPARATUS FOR CASTING BODIES FORMED OF CEMENT OR THE LIKE.
APPLICATION FILED MAY 18, 1916.
1,227,824.
Patented May 29, 1917.
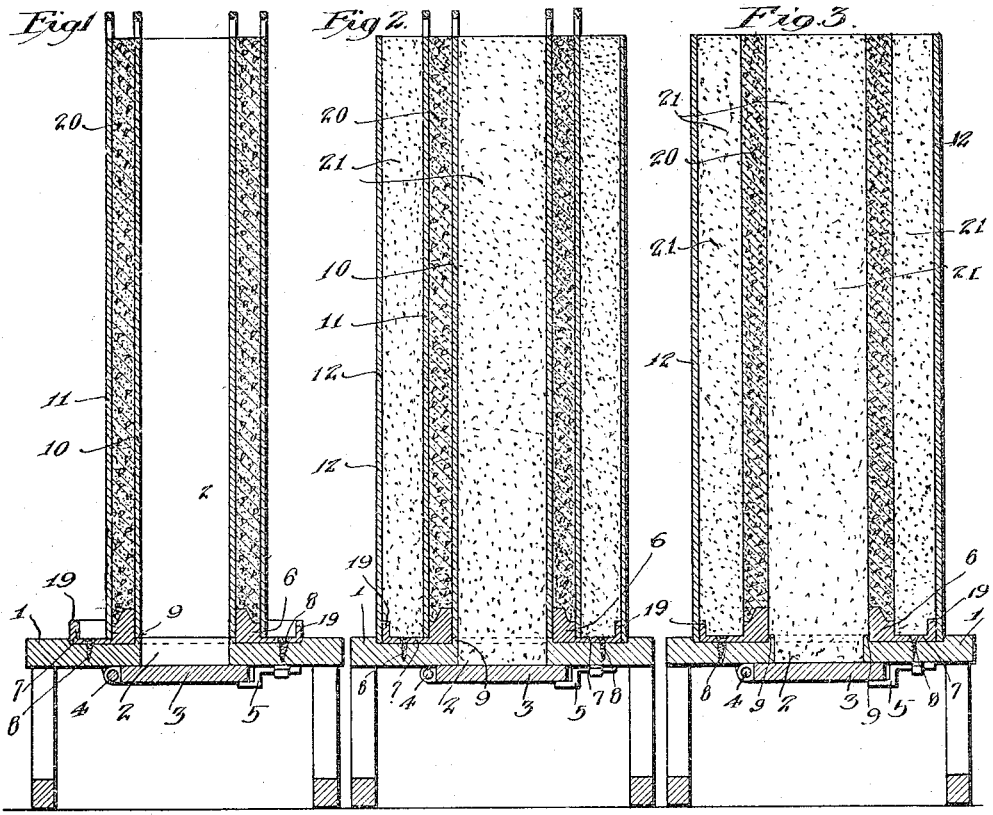
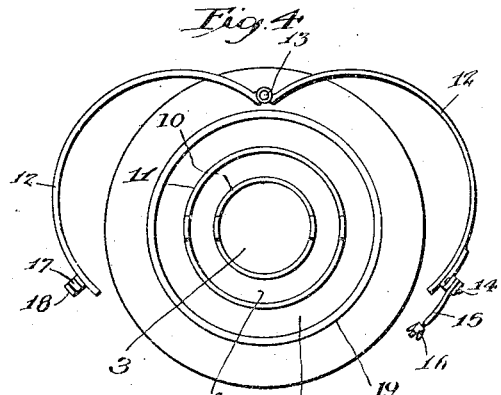
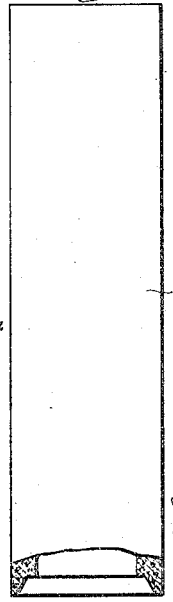
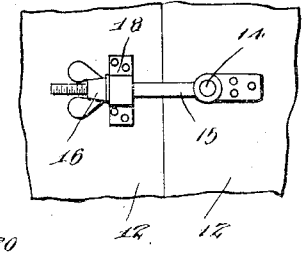
Inventor
John Cotter Pelton

UNITED STATES PATENT OFFICE.

JOHN COTTER PELTON, OF SAN FRANCISCO, CALIFORNIA.

APPARATUS FOR CASTING BODIES FORMED OF CEMENT OR THE LIKE.

1,227,824. Specification of Letters Patent. Patented May 29, 1917.

Application filed May 18, 1916. Serial No. 98,262.

*To all whom it may concern:*

Be it known that I, JOHN COTTER PELTON, a citizen of the United States, residing at San Francisco, in the county of San Francisco and State of California, have invented a new and useful Apparatus for Casting Bodies Formed of Cement or the like, of which the following is a specification.

This invention relates to casting or molding members constructed of cement or the like and also relates to the apparatus by which the method is carried out.

An object of this invention is to facilitate the manufacture of cement members.
Another object is to facilitate the manufacture of hollow cement bodies or members such, for instance, as pipes or tubes.

Cement pipes are largely employed at the present time in the construction of sewers and the like and said pipes are generally manufactured by introducing cement, concrete or other suitable composition into a mold and allowing the material thus introduced to set and partially harden before removing the mold. This of course entails the use of a relatively large number of molds since the setting of the material requires considerable time. It is obvious that the setting of the cement is more or less delayed or retarded by reason of the walls of the mold interfering with the ready evaporation of water from the material, and an object of this invention is to make provision whereby the mold may be removed from the cement body immediately after the cement or other substance of which the body is to be constructed has been introduced into the mold, thus also facilitating drying or dehydrating of the molded body or member.

Another object is to insure against too quick drying of the cast or molded bodies so that the quality of product will be of the best.
Another object is to effect the foregoing in as simple and inexpensive manner as possible.

Other objects and advantages may appear in the subjoined detail description.
The accompanying drawings illustrate one suitable form of the invention.

Figure 1 is a mid sectional elevation of that portion of the newly invented apparatus used in performing the first step of the novel method, the cement body being shown in the mold.

Fig. 2 is a sectional elevation of the entire apparatus for carrying out the novel method, the cement body being shown in the mold as in Fig. 1 and loose material being shown inside of the mold and inside of the receptacle.

Fig. 3 is a sectional elevation corresponding to Fig. 2 excepting that the mold is omitted.

Fig. 4 is a plan view of the apparatus, the receptacle being shown in open position.

Fig. 5 is a side elevation partly in vertical mid section of a tubular member or pipe constructed in accordance with this invention.

Fig. 6 is an enlarged detail of one of the latches.

There is provided a suitable bench 1 having a vertical orifice 2 and said orifice may be closed by any suitable means, for instance by a heap of loose material such as sand beneath the bench, or, as shown in the drawings, by a gate 3 hinged at 4 to the under side of the bench 1 and normally held closed by a latch 5 of any suitable construction.

The top of the bench 1 is partly formed of an annulus or ring 6 having a flange 7 fastened by screws 8 or the like to the main body of the bench to hold said ring in place, said flange preferably being flush with the upper surface of the main body of the bench. The inside diameter of the ring 6 is slightly greater than the diameter of the orifice 2 to form an annular seat 9 to support an inner mold member 10 of any suitable form, said mold member in the instance shown being tubular.

Surrounding the inner mold member 10 is an outer mold member 11 spaced apart therefrom and having its lower end seated on the flange 7 against the periphery of the ring 6, said ring 6 functioning, as is clear, as a spacer to hold the inner and outer mold members in concentric relation so that the body to be molded will be of uniform thickness throughout.

Means are provided to form a receptacle surrounding the mold members 10, 11, said receptacle, in the instance shown in the drawings, being in the form of a tubular body comprising two semicircular members 12 hinged together at 13 and said receptacle being provided with a latch to hold the two members thereof in closed position as in Fig. 6, said latch being constructed as follows: To one of the receptacle members 12 is pivoted at 14 a bolt 15 provided with a wing nut 16, said bolt being adapted, when the receptacle members are in closed position to engage a slot 17 of a lug 18 projecting from the other member 12, the wing nut being screwed up tight against the lug when the receptacle members are closed. To open the receptacle all that is necessary is to loosen the wing nut 16 and swing the bolt 15 out of the slot 17 whereupon the members may be swung apart as shown in Fig. 4. But one latch has been described in detail, but it is understood that one or more latches may be provided as desired.

When the receptacle 12, 12 is in place, the lower end thereof rests on the flange 7 which is provided with an annular boss 19 fitting the inside of the receptacle, when closed, so as to hold said receptacle concentric with the mold members 10, 11.

In practice the above described apparatus may be operated as will now be described.

To manufacture tubular bodies or pipe, for instance, in accordance with this invention, the mold members 10, 11 will be placed in position on the bench 1 and concrete or other composition of which the pipe is to be manufactured will be introduced in the space between the mold members to form a cast or molded body 20 as in Fig. 1. Then the receptacle 12, 12 will be placed in position on the bench and loose material 21 such, for instance, as sand will be introduced into the space within the mold member 10 and into the annular space between the outer mold member 11 and wall of the receptacle 12, 12 as in Fig. 2. Thus the mold is embedded in loose material.

Then the mold members 10, 11 will be withdrawn by suitable means, for instance by a rope and tackle or by a power operated derrick, not shown, so that the sand 21 or other loose material will flow into contact with the inner and outer surfaces of the cement body 20 to hold said cement body in its molded form as shown in Fig. 3.

After the cement 20 has remained in the sand sufficiently long for it to set and partially harden, the gate 3 and the receptacle 12, 12 will be opened to allow the sand or other loose material to escape from the interior of the molded body 20 and from the receptacle 12, 12, whereupon the molded body will be set to one side to harden to the desired degree before use in laying a sewer or other pipe line. A very good way of expelling the sand from the mold is to flush it away with a stream of water.

The sand 21 allows sufficient moisture to evaporate from the molded body 20 so that it will set and at the same time said sand will prevent too rapid drying or dehydrating of the said body, thus insuring that the finished product be of good quality.

Though I have shown the receptacle 12, 12 containing but one mold, it is understood that the receptacle may be of any suitable character and size capable of containing a plurality of molds, and this would be especially desirable when smaller sizes of cast bodies are being manufactured.

Compacting of the material entering into the construction of the cast bodies can be effected by tamping in a manner well known in the art, but preferably the bench 1 will be jarred by suitable means such, for instance, as those disclosed in my patent for process and apparatus for compacting concrete and the like No. 1,178,097, issued April 4, 1916.

The foregoing will enable those skilled in the art to which it appertains to make and use the invention.

I claim:

1. In combination, a bench, two hollow concentric mold members spaced apart from one another and mounted on the bench, an openable receptacle surrounding the mold members and spaced apart therefrom and mounted on the bench, and means on the bench to fix the position of said receptacle relative to the outer mold member.

2. In combination, a bench having an orifice, two hollow concentric mold members spaced apart from one another and mounted on the bench, said orifice communicating with the interior of the inner mold member, a removable closure for the orifice, and a receptacle surrounding the mold members and spaced apart therefrom and mounted on the bench.

3. The combination, a bench having an orifice, two hollow concentric mold members spaced apart from one another and mounted on the bench, said orifice communicating with the interior of the inner mold member, a gate to close said orifice, and a receptacle surrounding the mold members and spaced apart therefrom and mounted on the bench.

4. In combination, a bench having an orifice, two hollow concentric mold members spaced apart from one another and mounted on the bench, a removable closure for the orifice, a receptacle surrounding the mold members and spaced apart therefrom and mounted on the bench, said receptacle comprising two hingedly connected members, and a latch to hold said receptacle members in closed position.

5. In combination, a bench, two hollow spaced apart mold members one inside of the other mounted on the bench to receive between them the material to be cast, and openable means to hold loose material around the outer mold member, so that when said means are open the loose material will flow away from the article cast in the mold space.

Signed at Los Angeles, California, this 9th day of May, 1916.

JOHN COTTER PELTON.

Witnesses:
GEORGE H. HILES,
ANNA F. SCHMIDTBAUER.

Copies of this patent may be obtained for five cents each, by addressing the "Commissioner of Patents, Washington, D. C."